United States Patent
Horng et al.

(10) Patent No.: US 8,436,497 B2
(45) Date of Patent: May 7, 2013

(54) ROTOR FOR MOTOR

(75) Inventors: Alex Horng, Kaohsiung (TW); Hung Jen Chuang, Kaohsiung (TW); Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 310 days.

(21) Appl. No.: 12/938,419

(22) Filed: Nov. 3, 2010

(65) Prior Publication Data

US 2012/0062050 A1 Mar. 15, 2012

(30) Foreign Application Priority Data

Sep. 13, 2010 (TW) .............................. 99130875 A

(51) Int. Cl.
*H02K 1/27* (2006.01)
*H02K 15/03* (2006.01)

(52) U.S. Cl.
USPC .................. 310/43; 310/156.08; 310/156.09

(58) Field of Classification Search ............. 310/43, 310/156.12–156.13, 156.09
See application file for complete search history.

(56) References Cited

U.S. PATENT DOCUMENTS

| | | | | |
|---|---|---|---|---|
| 4,035,676 A | * | 7/1977 | Adair | 310/156.12 |
| 5,298,826 A | * | 3/1994 | Lee et al. | 310/156.09 |
| 5,500,994 A | * | 3/1996 | Itaya | 29/598 |
| 5,945,758 A | * | 8/1999 | Goltz et al. | 310/90 |
| 6,198,372 B1 | * | 3/2001 | Schwarz | 335/302 |
| 6,452,383 B1 | * | 9/2002 | Goedecke | 324/207.22 |
| 6,765,319 B1 | * | 7/2004 | Thompson | 310/43 |
| 7,120,986 B2 | * | 10/2006 | Kojima et al. | 29/596 |
| 7,732,970 B2 | | 6/2010 | Büttner et al. | |
| 7,786,641 B2 | | 8/2010 | Nishijima | |
| 7,806,819 B2 | | 10/2010 | Eigemeier | |
| 2007/0290570 A1 | * | 12/2007 | Okada et al. | 310/261 |
| 2010/0066189 A1 | * | 3/2010 | Horng et al. | 310/156.09 |

FOREIGN PATENT DOCUMENTS

| | | | |
|---|---|---|---|
| CN | 201118294 Y | | 9/2008 |
| JP | 56-117567 A | * | 9/1981 |
| JP | 2000-188838 | | 7/2000 |
| JP | 2001-327106 | * | 11/2001 |

* cited by examiner

*Primary Examiner* — Burton Mullins
(74) *Attorney, Agent, or Firm* — Alan Kamrath; Kamrath IP Lawfirm, P.A.

(57) ABSTRACT

A rotor for a motor includes a shaft having an outer periphery with an engaging portion. At least one coupling member includes an engaging hole. The shaft extends through the engaging hole of the at least one coupling member. The at least one coupling member is engaged with the engaging portion of the shaft by tight coupling. A plastic magnet envelops the shaft and the at least one coupling member by injection molding. The at least one coupling member prevents the plastic magnet from disengaging from the shaft, providing enhanced engaging effect while reducing structural complexity and enhancing assembling convenience.

14 Claims, 11 Drawing Sheets

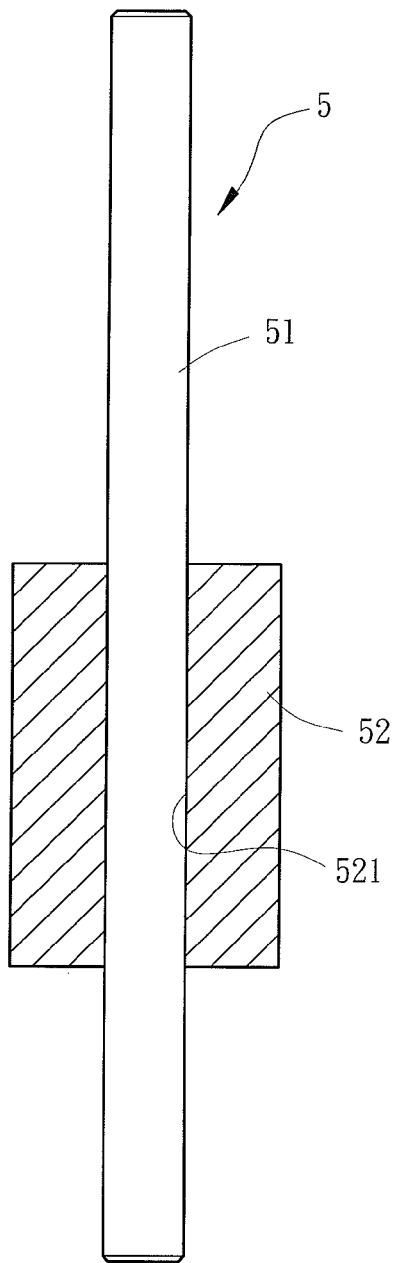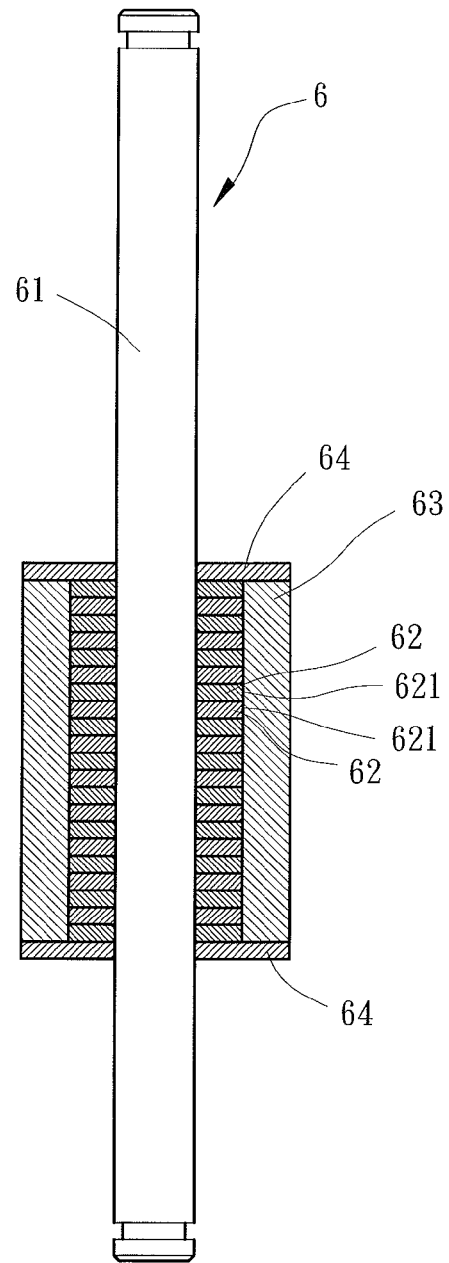
FIG. 1
PRIOR ART
FIG. 2
PRIOR ART

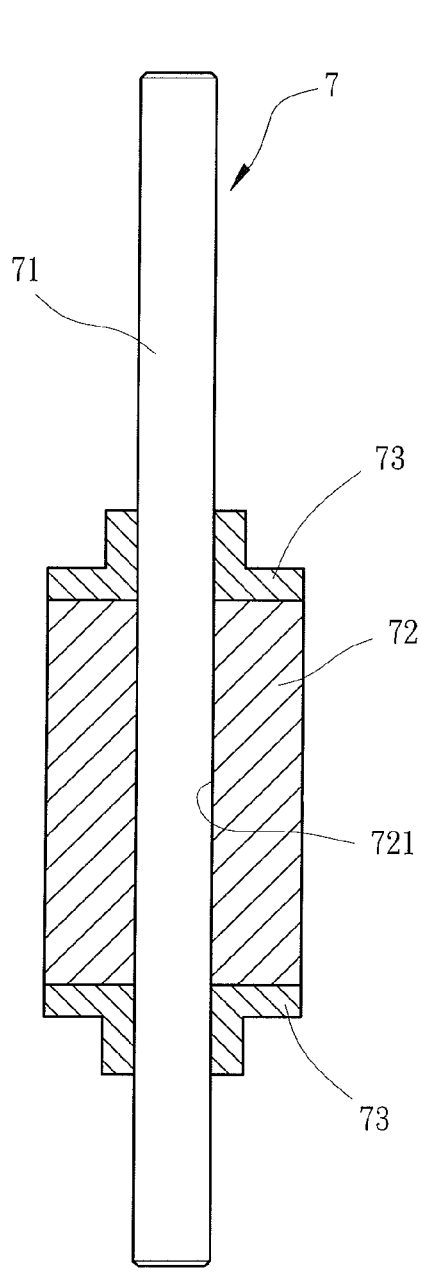
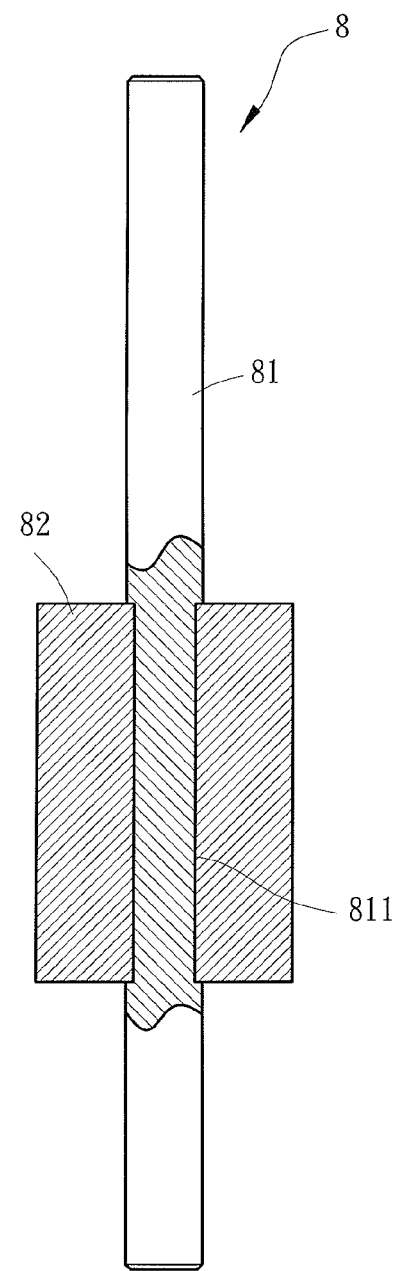
FIG. 3
PRIOR ART
FIG. 4
PRIOR ART

ROTOR FOR MOTOR

BACKGROUND OF THE INVENTION

1. Field of the Invention

The present invention relates to a rotor for a motor and, more particularly, to a rotor for a motor of an inner rotor type.

2. Description of the Related Art

Motors generally include an outer rotor type and an inner rotor type that is superior to the outer rotor type in rotational stability. Thus, inner rotor type motors are superior to outer rotor type motors in fulfilling the needs of heat dissipation in the design trends of high speed, integration of functions, and miniaturization.

There is a plurality of conventional inner rotor type motors. FIG. 1 shows a conventional rotor 5 for an inner rotor type motor. The rotor 5 includes a shaft 51 and a magnet 52. The magnet 52 includes a central axial hole 521 through which the shaft 51 extends. The shaft 51 can be in tight coupling with the central axial hole 521 of the magnet 52. However, the magnet 52 is liable to break. In another approach, the shaft 51 is bonded by adhesive to the central axial hole 521 of the magnet 52. However, the adhesive is liable to lose its adhesiveness due to deterioration, resulting in disengagement or undesired rotation of the magnet 52 from or relative to the shaft 51.

FIG. 2 shows a conventional rotor 6 for an inner rotor type motor disclosed in Taiwan Patent Application No. 97104952. The rotor 6 includes a shaft 61, a plurality of magnet retaining plates 62, at least two magnets 63, and two washers 64. The magnet retaining plates 62 are stacked around the outer periphery of the shaft 61 and each have at least two retaining grooves 621 for securely receiving the magnets 63. The washers 64 sandwich the magnet retaining plates 62 and the magnets 63. Due to the arrangement of the magnet retaining plates 62 and the washers 64, the magnets 63 will not disengage from the shaft 61. However, the rotor 6 solves the disadvantages of the rotor 5 at the cost of a complicated structure, resulting in inconvenience in assembly.

FIG. 3 shows a conventional rotor 7 for an inner rotor type motor disclosed in Taiwan Patent Application No. 971178192. The rotor 7 includes a shaft 71, a magnet 72, and two fixing seats 73. The magnet 72 includes a central axial hole 721 through which the shaft 71 extends. The fixing seats 73 are in tight coupling with the shaft 71 and sandwich the magnet 72, fixing the magnet 72 in a predetermined location. By the arrangement of the fixing seats 73, the magnet 72 is prevented from disengaging from the shaft 71. However, the fixing seats 73 for sandwiching and fixing the magnet 72 cause limitation in the compact design of the rotor. Namely, the rotor 7 is still complicated and inconvenient to assemble.

FIG. 4 shows a conventional rotor 8 for an inner rotor type motor disclosed in Taiwan Patent Application No. 97135497. The rotor 8 includes a shaft 81 and a plastic magnet 82. The shaft 81 includes an outer periphery having a positioning portion 811. The plastic magnet 82 is formed by injection molding to envelop the outer periphery of the shaft 81 with an inner periphery of the plastic magnet 82 engaged with the positioning portion 811. Although enhanced engaging stability is provided between the shaft 81 and the plastic magnet 82, the outer periphery of the rotor 8 must be processed to form the positioning portion 811, leading to inconvenience in manufacturing of the rotor 8. Furthermore, the engaging area provided by the positioning portion 811 is limited. Namely, the resultant engaging stability between the plastic magnet 82 and the shaft 81 is still insufficient.

FIG. 5 shows a conventional rotor 9 for an inner rotor type motor disclosed in Chinese Patent Publication Application No. CN201118294. The rotor 9 includes a magnetic hub 91, an engaging member 92, and a shaft 93. The magnetic hub 91 and the shaft 93 are placed in a mold to form the engaging member 92 by injection molding. Thus, the engaging member 92 is integrally formed with the magnetic hub 91 and the shaft 93 as a single monolithic member to prevent disengagement therebetween. However, the engaging member 92 is liable to deform due to overheating during high speed rotation of the rotor 9, resulting in poor rotational balance as well as disengagement between the magnetic hub 91, engaging member 92, and shaft 93. Thus, the overall engaging stability of the rotor 9 is still insufficient. Thus, a need exists for an improved rotor that overcomes the disadvantages encountered during actual use of the conventional rotors 5, 6, 7, 8, and 9.

SUMMARY OF THE INVENTION

An objective of the present invention is to provide a rotor for a motor that provides enhanced engaging stability between the shaft and the plastic magnet.

Another objective of the present invention is to provide a rotor for a motor that can be assembled more easily.

A further objective of the present invention is to provide a rotor for a motor that has less complicated structure.

The present invention fulfills the above objectives by providing a rotor for a motor including a shaft having an outer periphery with an engaging portion. A first coupling member includes an engaging hole. The shaft extends through the engaging hole of the first coupling member. The first coupling member is engaged with the engaging portion of the shaft by tight coupling. A plastic magnet envelops the shaft and the first coupling member by injection molding.

Preferably, the outer periphery of the first coupling member includes a positioning portion such that the first coupling member has non-circular cross sections perpendicular to an axial direction of the first coupling member. The plastic magnet is engaged with the positioning portion. The positioning portion can include a plurality of recessed portions, protruded portions, or rugged faces formed on an outer periphery of the first coupling member.

Preferably, the plastic magnet integrally envelops an intermediate portion of the shaft.

Preferably, the engaging portion of the shaft has an outer diameter perpendicular to an axial direction of the shaft. The engaging hole of the first coupling member has a diameter perpendicular to the axial direction of the shaft. The diameter of the engaging hole of the first coupling member is smaller than the outer diameter of the engaging portion of the shaft.

Preferably, the rotor further includes a second coupling member having an engaging hole. The shaft extends through the engaging hole of the second coupling member. The second coupling member is engaged with the engaging portion of the shaft by tight coupling. The second coupling member is spaced from the first coupling member in an axial direction of the shaft.

Preferably, the first and second coupling members are metal rings that are less hard than the shaft.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where:

FIG. 1 shows a cross sectional view of a conventional rotor for a motor.

FIG. 2 shows a cross sectional view of another conventional rotor for a motor.

FIG. 3 shows a cross sectional view of a further conventional rotor for a motor.

FIG. 4 shows a cross sectional view of still another conventional rotor for a motor.

Figure 5:
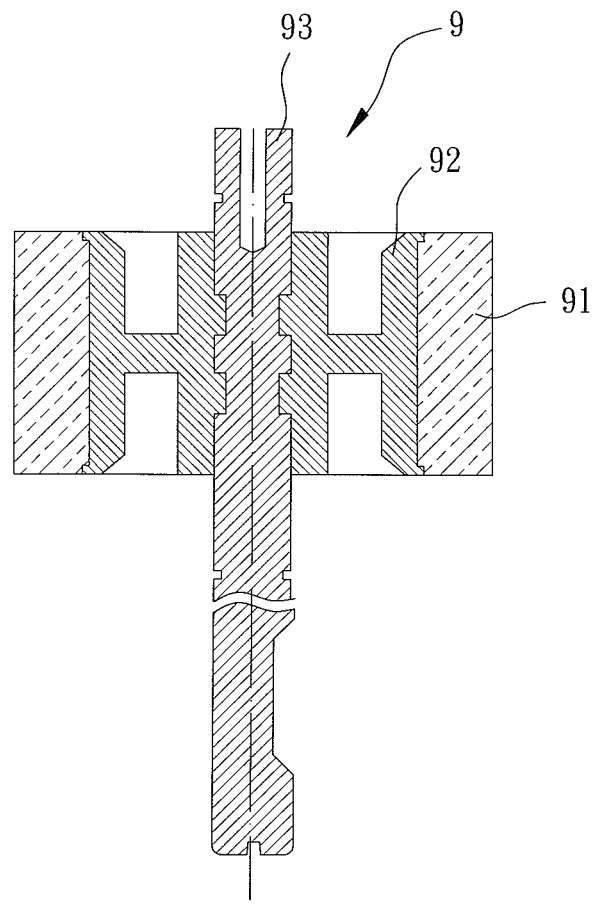
FIG. 5 shows a cross sectional view of yet another conventional rotor for a motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "side", "portion", "section", "axial", "annular", and similar terms are used herein, it should be understood that these terms refer only to the structure shown in the drawings as it would appear to a person viewing the drawings and are utilized only to facilitate describing the invention.

DETAILED DESCRIPTION OF THE INVENTION

Figure 6:
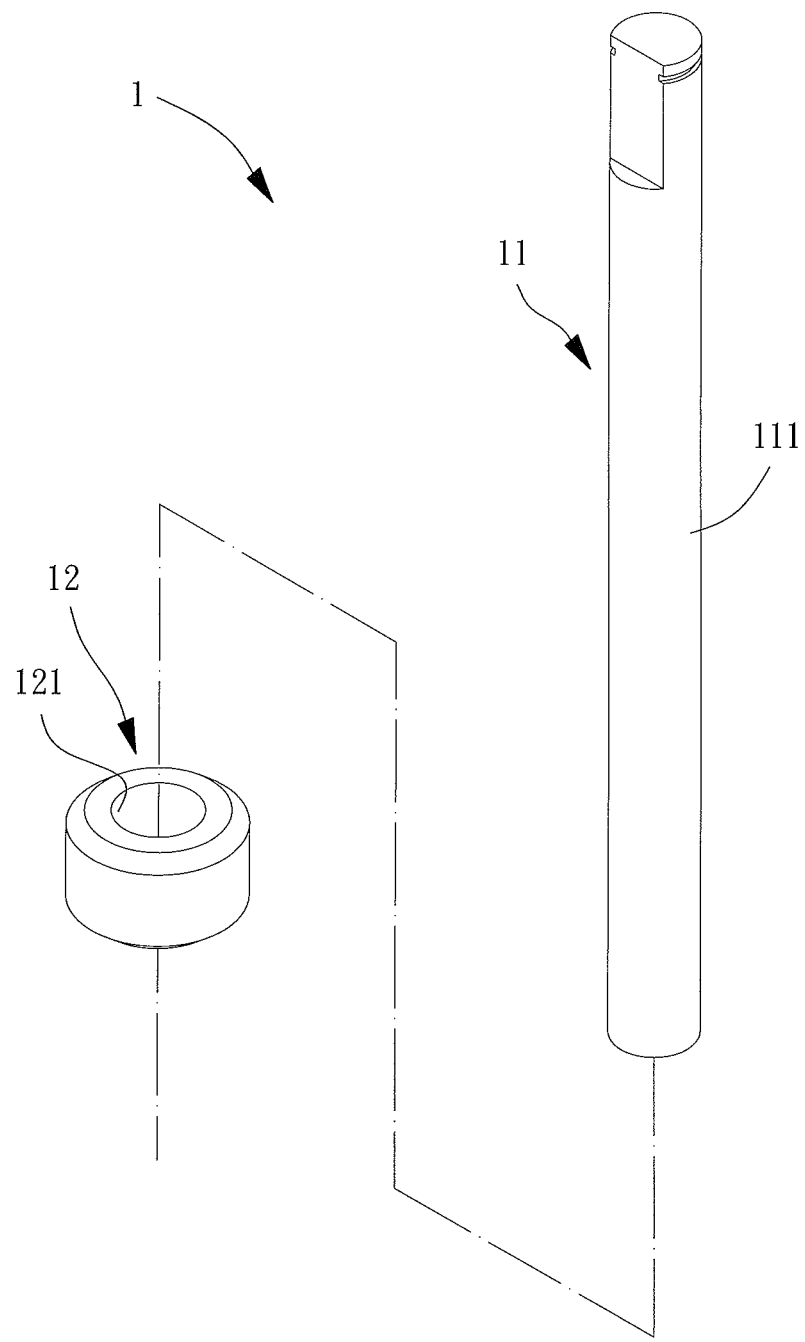
FIG. 6 shows an exploded, perspective view of a shaft and a coupling member of a rotor for a motor of a first embodiment according to the present invention.
Figure 7:
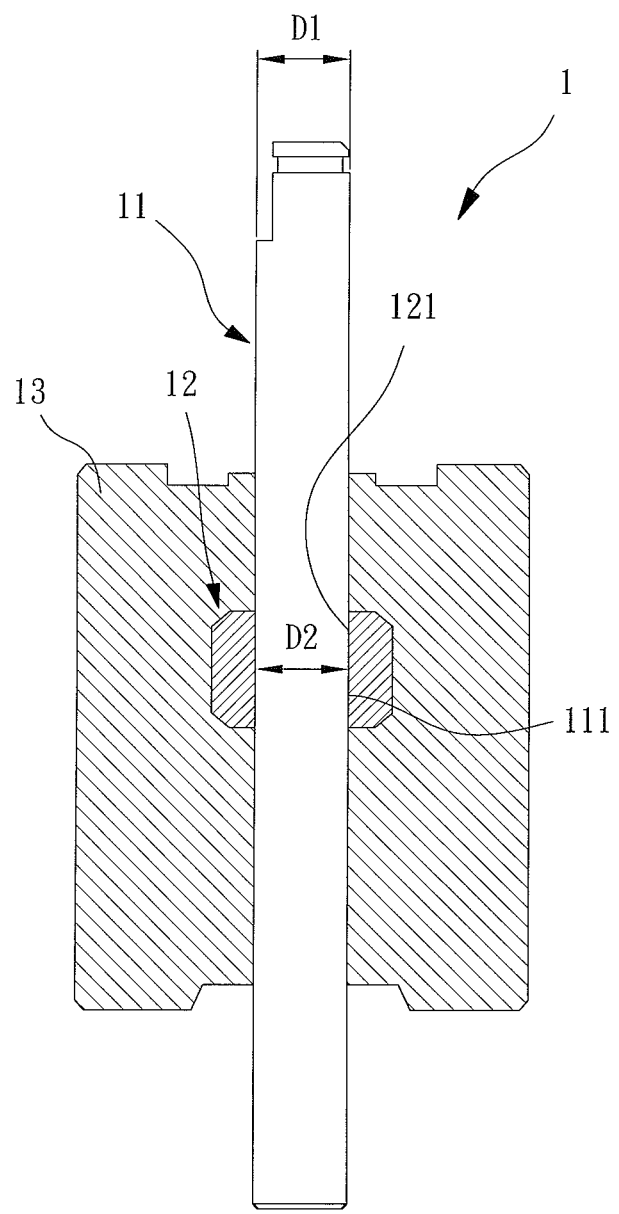
FIG. 7 shows a cross sectional view of the rotor of the first embodiment after assembly.

With reference to FIGS. 6 and 7, a rotor 1 for a motor of a first embodiment according to the present invention includes a shaft 11, a coupling member 12, and a plastic magnet 13. The shaft 11 and the coupling member 12 are tightly engaged with each other. The plastic magnet 13 integrally envelops the shaft 11 and the coupling member 12. The coupling member 12 prevents the plastic magnet 13 from disengaging from the shaft 11.

The shaft 11 can be a rod made of stainless steel. The shaft 11 includes an outer periphery having an engaging portion 111. The engaging portion 111 has an outer diameter D1 perpendicular to an axial direction of the shaft 11.

The coupling member 12 can be a metal ring that is less hard than the shaft 11. As an example, the coupling member 12 can be an annular member made of copper such that the shaft 11 is less likely to be damaged by the coupling member 12 when the coupling member 12 is engaged with the shaft 11 by tight coupling. Furthermore, the coupling member 12 includes an engaging hole 121 extending from a side through the other side of the coupling member 12. Further, the engaging hole 121 has a diameter D2 perpendicular to the axial direction of the shaft 11. The diameter D2 of the engaging hole 121 is slightly smaller than the outer diameter D1 of the engaging portion 111 of the shaft 11. Thus, when the coupling member 12 is mounted around the engaging portion 111 of the shaft 11 with the shaft 11 extending through the engaging hole 121, the coupling member 12 and the shaft 11 can be more reliably engaged with each other through tight coupling.

The plastic magnet 13 can be made of plastic material mixed with magnetic powders. After the coupling member 12 is tightly engaged with the shaft 11, the coupling member 12 and the shaft 11 are placed in a mold, and the plastic magnet 13 is formed by injection molding to simultaneously envelop the coupling member 12 and an intermediate portion of the shaft 11.

By such an arrangement, since the coupling member 12 is tightly engaged with the engaging portion 111 of the shaft 11 beforehand, the plastic magnet 13 can engage with the shaft 11 after the plastic magnet 13 integrally envelops the shaft 11 and the coupling member 12. Furthermore, due to coupling between the plastic magnet 13 and the coupling member 12, the plastic magnet 13 is prevented from moving axially on or disengaging from the shaft 11. Thus, enhanced engaging stability is provided between the shaft 11, the coupling member 12, and the plastic magnet 13.

Figure 8:
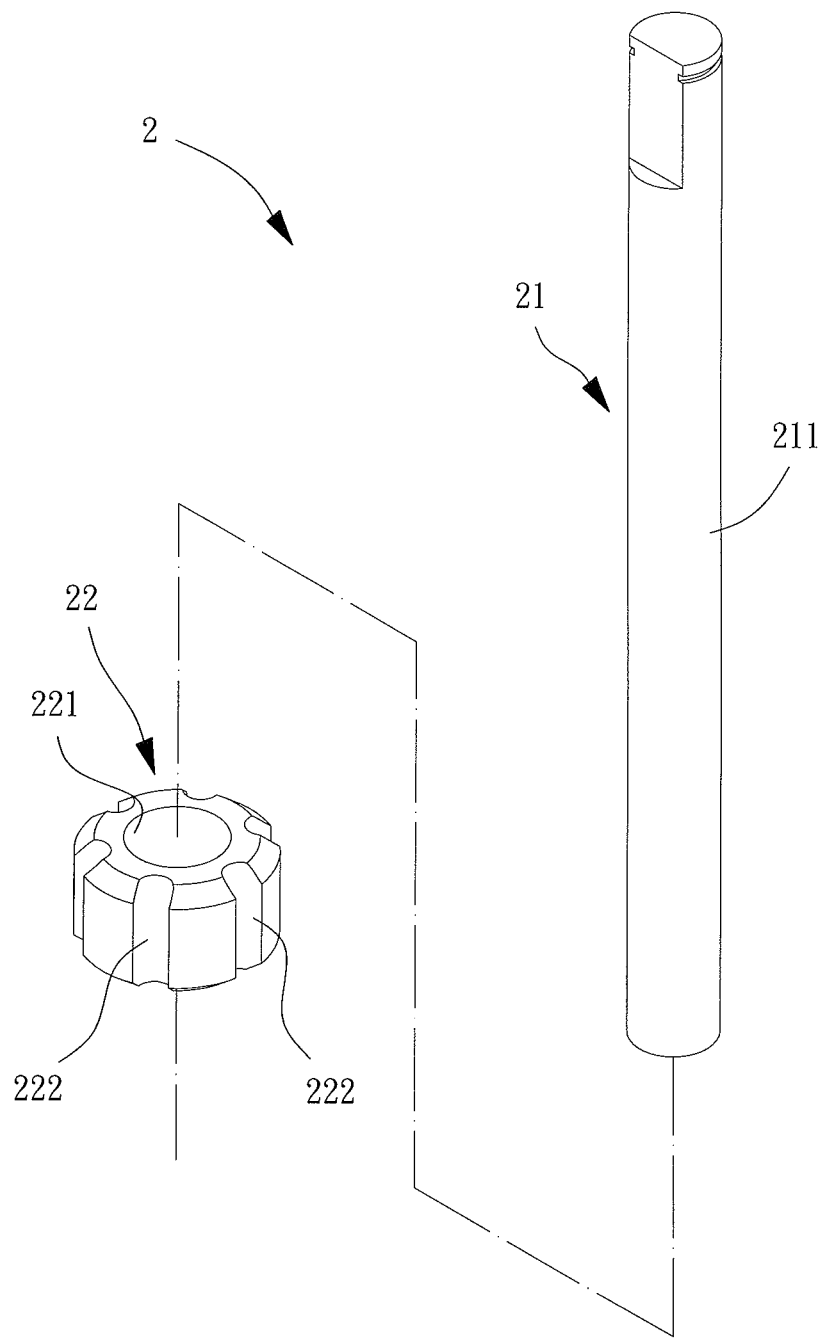
FIG. 8 shows an exploded, perspective view of a shaft and a coupling member of a rotor for a motor of a second embodiment according to the present invention.
Figure 9:
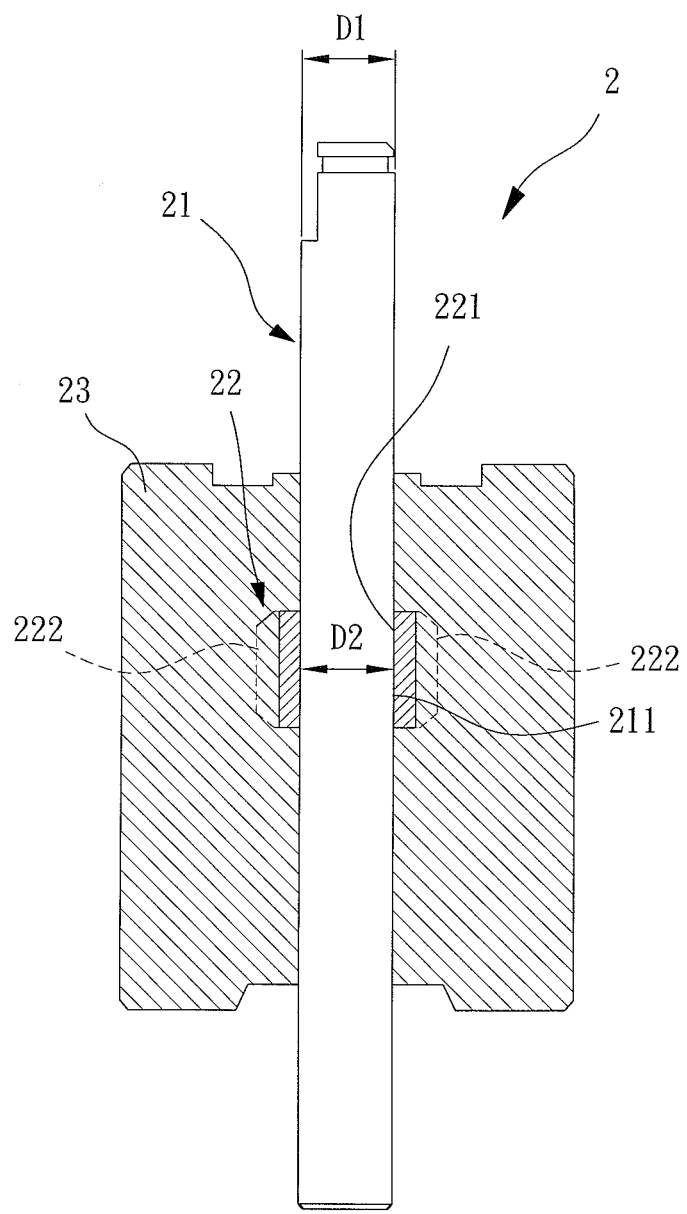
FIG. 9 shows a cross sectional view of the rotor of the second embodiment after assembly.
Figure 10:
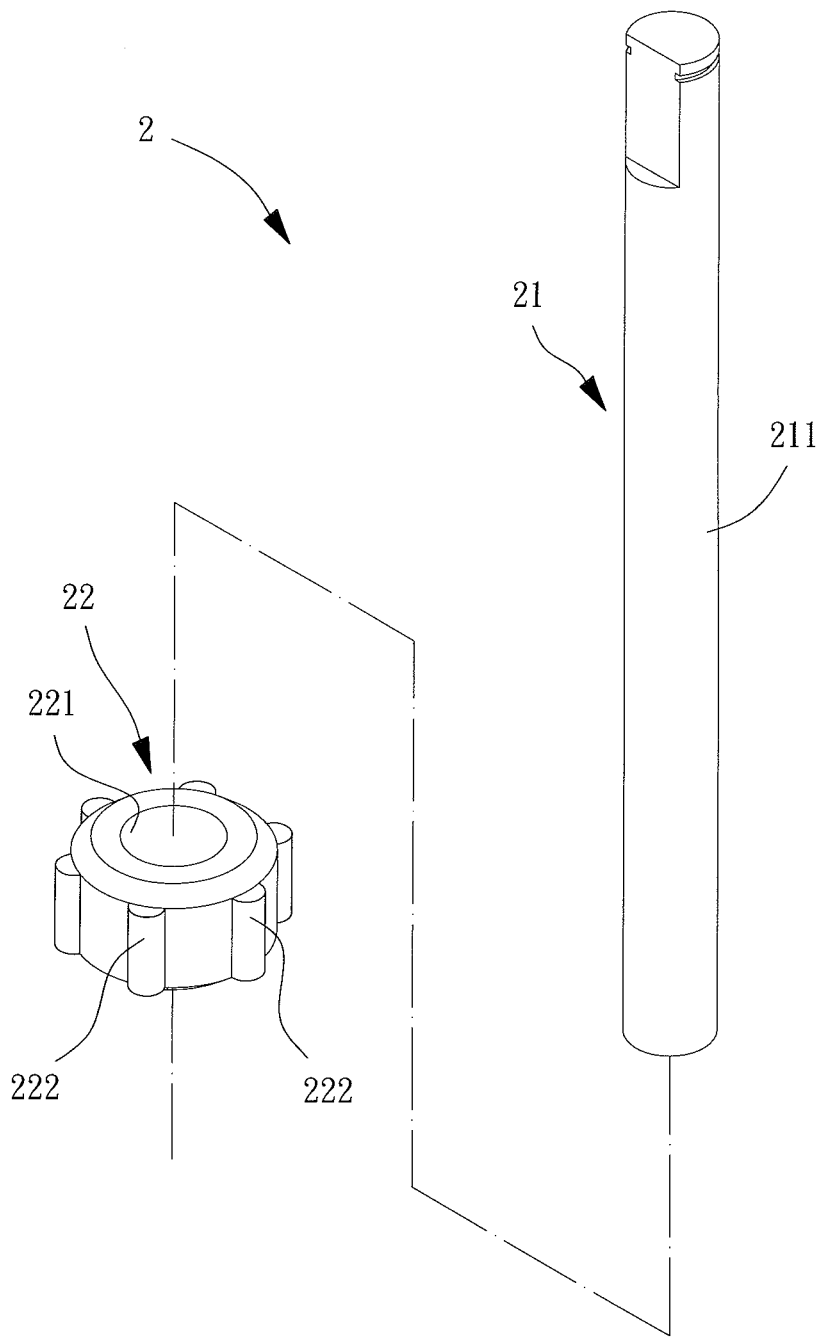
FIG. 10 shows an exploded, perspective view of the shaft and another coupling member of the rotor for the motor of the second embodiment according to the present invention.
Figure 11:
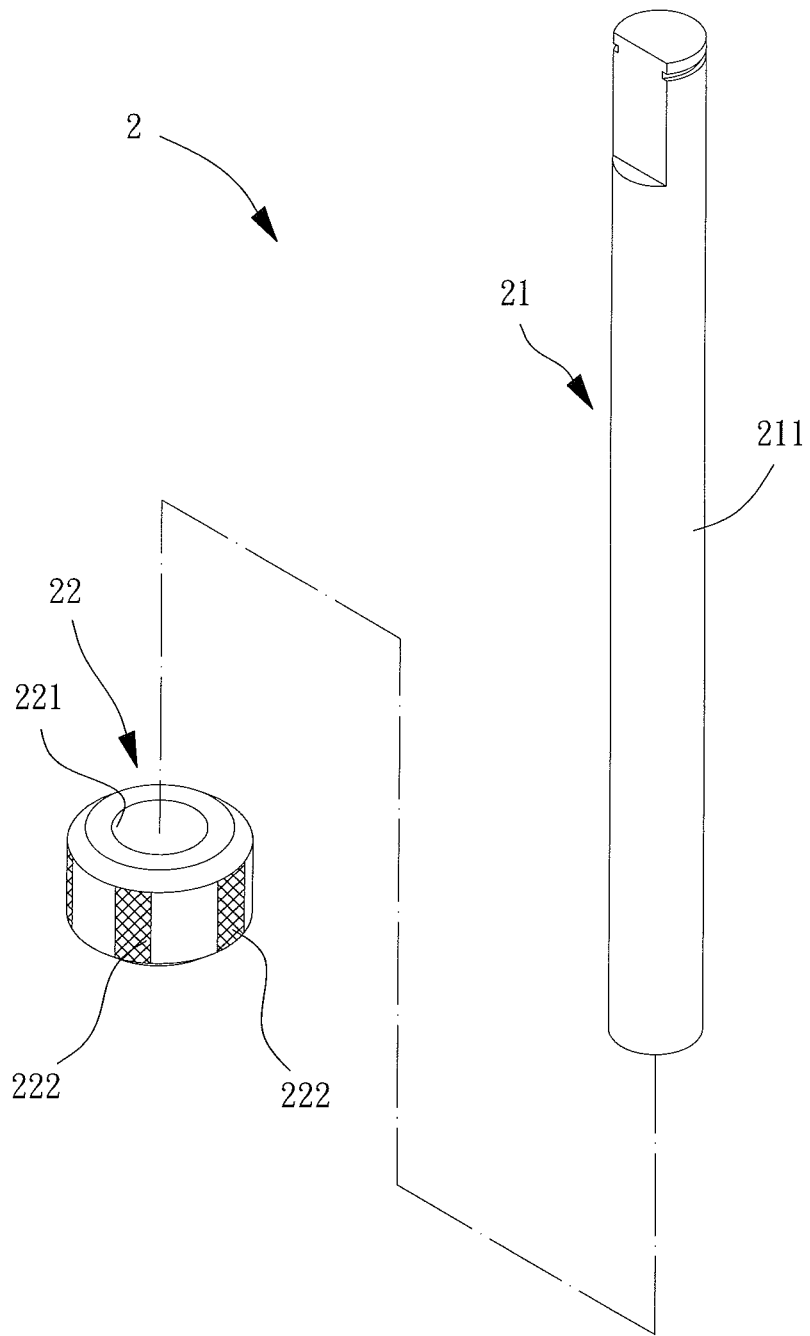
FIG. 11 shows an exploded, perspective view of the shaft and another coupling member of the rotor for the motor of the second embodiment according to the present invention.

With reference to FIGS. 8 to 11, similar to the rotor 1 of the first embodiment, a rotor 2 for a motor of a second embodiment according to the present invention includes a shaft 21 with an engaging portion 211, a coupling member 22 with an engaging hole 221, and a plastic magnet 23. The difference between the rotor 2 of the second embodiment and the rotor 1 of the first embodiment is that the coupling member 22 includes an outer periphery having a positioning portion 222 such that the engaging member 22 has non-circular cross sections perpendicular to an axial direction of the coupling member 22 for engagement with the plastic magnet 23. Examples of the positioning portion 222 include recessed portions (such as grooves, depressions, or holes) as shown in FIGS. 8 and 9, protruded portions (such as ribs or protrusions) as shown in FIG. 10, or rugged faces (such as knurls) as shown in FIG. 11, on the outer periphery of the coupling member 22. In this embodiment, the positioning portion 222 includes a plurality of annularly spaced grooves formed in an outer periphery of the coupling member 22.

By the above technical feature, the coupling member 22 of the rotor 2 of the second embodiment has non-circular cross sections due to provision of the positioning portion 222. Thus, the plastic magnet 23 engages with the positioning portion 222 when the plastic magnet 23 integrally envelops the coupling member 22 and the intermediate portion of the shaft 21. Thus, the coupling member 22 not only prevents the plastic magnet 23 from moving axially or disengaging from the shaft 21, but also prevents the plastic magnet 23 from rotating relatively to the shaft 21, providing further enhanced positioning effect in the axial direction.

Figure 12:
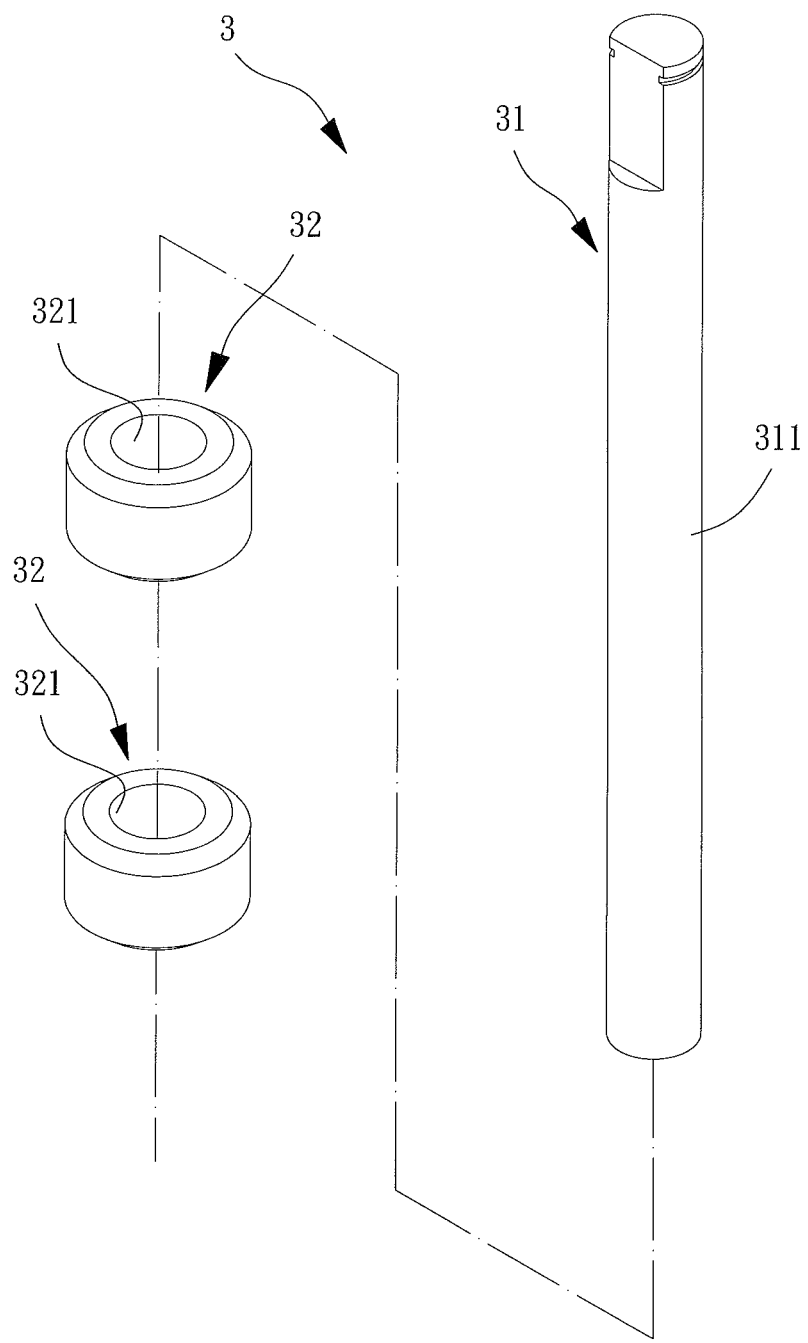
FIG. 12 shows an exploded, perspective view of a shaft and two coupling members of a rotor for a motor of a third embodiment according to the present invention.
Figure 13:
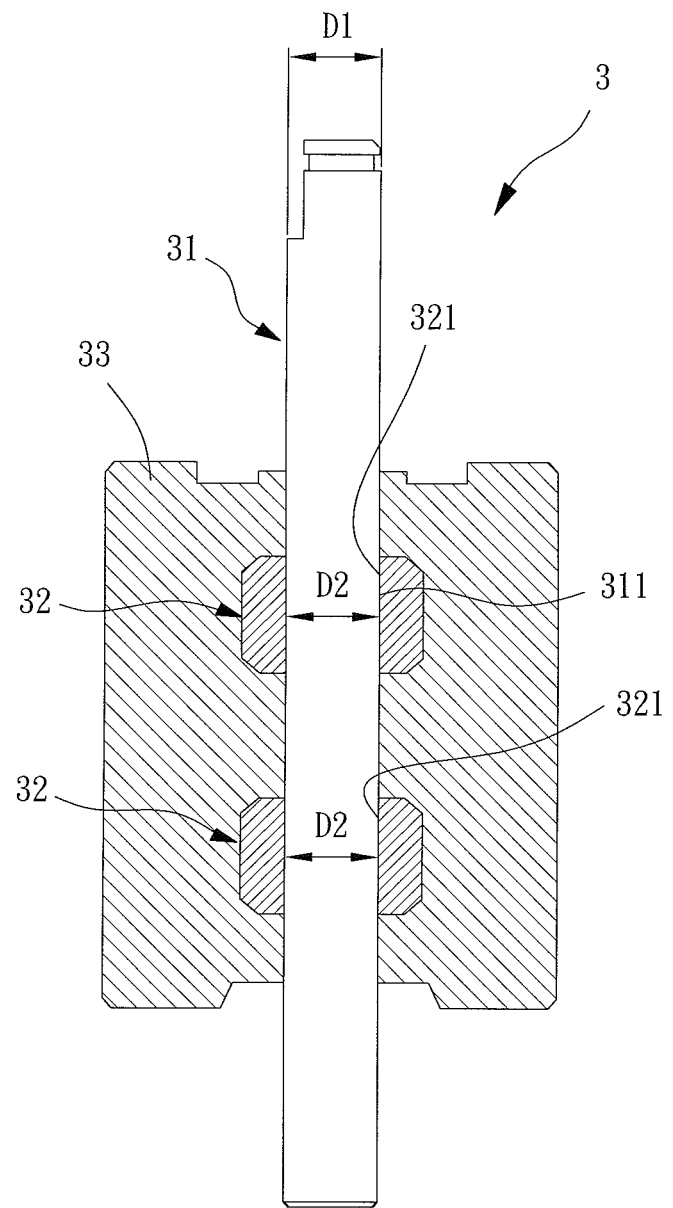
FIG. 13 shows a cross sectional view of the rotor of the third embodiment after assembly.

With reference to FIGS. 12 and 13, similar to the rotor 1 of the first embodiment, a rotor 3 for a motor of a third embodiment according to the present invention includes a shaft 31 with an engaging portion 311, a coupling member 32 with an engaging hole 321, and a plastic magnet 33. The difference between the rotor 3 of the third embodiment and the rotor 1 of the first embodiment is that the rotor 3 includes a plurality of coupling members 32 spaced in the axial direction of the shaft 31. The plastic magnet 33 simultaneously and integrally envelops the intermediate portion of the shaft 31 and the coupling members 32.

By the above technical feature, compared to the rotor 1 of the first embodiment, the engaging area between the plastic magnet 33 and the coupling members 32 of the third embodiment is increased after the plastic magnet 33 of the rotor 3 integrally envelops the shaft 31 and the coupling members 32, providing the plastic magnet 33 with further enhanced engaging effect. Thus, disengagement of the plastic magnet 33 from the shaft 31 is further avoided.

According to the above, the rotors 1, 2, 3 of the present invention use the plastic magnets 13, 23, 33 that are made of plastic material mixed with magnetic powders and that are formed by injection molding to simultaneously envelop the shafts 11, 21, 31 and at least one coupling member 12, 22, 32, achieving several effects.

Firstly, the present invention provides rotors 1, 2, 3 for a motor in which the plastic magnets 13, 23, 33 are prevented from moving axially or disengaging from the shafts 11, 21, 31 when the plastic magnets 13, 23, 33 simultaneously envelop the shafts 11, 21, 31 and the coupling members 12, 22, 32, providing enhanced engaging stability. This is because the coupling members 12, 22, 32 have been tightly engaged with the engaging portions 111, 211, 311 of the shafts 11, 21, 31 beforehand.

Secondly, the present invention provides rotors 1, 2, 3 for a motor that can be assembled by simply engaging the coupling members 12, 22, 32 with the engaging portions 111, 211, 311 of the shafts 11, 21, 31 by tight coupling and then by injection molding to make the plastic magnets 13, 23, 33 simultaneously envelop the shafts 11, 21, 31 and the coupling members 12, 22, 32. The whole assembling process is easy, and assembling convenience is enhanced.

Thirdly, the present invention provides rotors 1, 2, 3 for a motor that merely include the shafts 11, 21, 31, the coupling members 12, 22, 32, and the plastic magnets 13, 23, 33. The whole structure is simple, reducing structural complexity.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A rotor for a motor comprising:
a shaft including an outer periphery having an engaging portion;
a first coupling member including an engaging hole, with the shaft extending through the engaging hole of the first coupling member, with the first coupling member engaged with the engaging portion of the shaft by tight coupling;
a second coupling member including an engaging hole, with the shaft extending through the engaging hole of the second coupling member, with the second coupling member engaged with the engaging portion of the shaft by tight coupling, with the second coupling member separably formed and spaced from the first coupling member in an axial direction of the shaft; and
a plastic magnet enveloping the shaft and the first and second coupling members by injection molding, with the plastic magnet enveloping the shaft intermediate the first and second coupling members.

2. The rotor for a motor as claimed in claim 1, with the plastic magnet integrally enveloping an intermediate portion of the shaft.

3. The rotor for a motor as claimed in claim 1, with the second coupling member being a metal ring having hardness smaller than the shaft.

4. The rotor for a motor as claimed in claim 1, with the first coupling member being a metal ring that is less hard than the shaft.

5. The rotor for a motor as claimed in claim 1, with the engaging portion of the shaft having an outer diameter perpendicular to an axial direction of the shaft, with the engaging hole of the first coupling member having a diameter perpendicular to the axial direction of the shaft, with the diameter of the engaging hole of the first coupling member smaller than the outer diameter of the engaging portion of the shaft.

6. The rotor for a motor as claimed in claim 1, with the engaging portion of the shaft having an outer diameter perpendicular to an axial direction of the shaft, with the engaging hole of the second coupling member having a diameter perpendicular to the axial direction of the shaft, with the diameter of the engaging hole of the second coupling member smaller than the outer diameter of the engaging portion of the shaft.

7. The rotor for a motor as claimed in claim 1, with an outer periphery of the second coupling member including a positioning portion, wherein the second coupling member has non-circular cross sections perpendicular to an axial direction of the second coupling member, with the plastic magnet engaged with the positioning portion.

8. The rotor for a motor as claimed in claim 7, with the positioning portion including a plurality of recessed portions formed on the outer periphery of the second coupling member.

9. The rotor for a motor as claimed in claim 7, with the positioning portion including a plurality of protruded portions formed on the outer periphery of the second coupling member.

10. The rotor for a motor as claimed in claim 7, with the positioning portion including a plurality of rugged faces formed on the outer periphery of the second coupling member.

11. The rotor for a motor as claimed in claim 7, with an outer periphery of the first coupling member including a positioning portion, wherein the first coupling member has non-circular cross sections perpendicular to an axial direction of the first coupling member, with the plastic magnet engaged with the positioning portion.

12. The rotor for a motor as claimed in claim 11, with the positioning portion including a plurality of recessed portions formed on the outer periphery of the first coupling member.

13. The rotor for a motor as claimed in claim 11, with the positioning portion including a plurality of protruded portions formed on the outer periphery of the first coupling member.

14. The rotor for a motor as claimed in claim 11, with the positioning portion including a plurality of rugged faces formed on the outer periphery of the first coupling member.

* * * * *